(12) United States Patent
Tran

(10) Patent No.: US 11,763,338 B1
(45) Date of Patent: Sep. 19, 2023

(54) ATTRIBUTING CONVERSION EVENTS TO VIEWABLE CONTENT IMPRESSIONS USING MULTIPLE EFFICACY ATTRIBUTES

(71) Applicant: Amazon Technologies, Inc., Seattle, WA (US)

(72) Inventor: Minh Chi Tran, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 523 days.

(21) Appl. No.: 15/719,076

(22) Filed: Sep. 28, 2017

(51) Int. Cl.
*G06Q 30/00* (2023.01)
*G06Q 30/0242* (2023.01)
*G06Q 30/0251* (2023.01)

(52) U.S. Cl.
CPC .............. *G06Q 30/0242* (2013.01); *G06Q 30/0251* (2013.01)

(58) Field of Classification Search
CPC ....... G06Q 30/0207-0277; G06Q 30/02; G06Q 30/0242; G06Q 30/0251
USPC .......................................... 705/14.41, 14.49
See application file for complete search history.

(56) References Cited

U.S. PATENT DOCUMENTS

| | | | | |
|---|---|---|---|---|
| 6,047,327 | A * | 4/2000 | Tso et al. | G06F 16/958 709/219 |
| 8,150,739 | B1 * | 4/2012 | Marggraff et al. | G06Q 30/0641 705/26.1 |
| 9,912,768 | B1 * | 3/2018 | Choi | H04L 67/025 |
| 2003/0009367 | A1 * | 1/2003 | Morrison | G06Q 30/02 705/7.29 |
| 2008/0046307 | A1 * | 2/2008 | Storey | G06Q 30/02 705/7.32 |
| 2011/0125573 | A1 * | 5/2011 | Yonezaki et al. | G06Q 30/0249 705/14.48 |
| 2011/0264485 | A1 * | 10/2011 | Notani et al. | G06Q 10/06 705/28 |

(Continued)

FOREIGN PATENT DOCUMENTS

CN 103327121 A * 9/2013

OTHER PUBLICATIONS

Patrick Johnston; Strategic Online Advertising_ Modeling Internet User Behavior with Advertising; SIEDS 2006; pages 162-167, 2006.*

(Continued)

*Primary Examiner* — Radu Andrei
(74) *Attorney, Agent, or Firm* — Eversheds Sutherland (US) LLP

(57) ABSTRACT

Systems, methods, and computer-readable media are disclosed for attributing conversion events to viewable content impressions using multiple efficacy attributes. In one embodiment, an example method may include determining, by one or more computer processors coupled to at least one memory, first content of a content campaign for presentation at a first user device, the content campaign related to a product or service, receiving a first indication of a first conversion event related to the product or service at the first user device, determining that a first impression of the first content was presented at the first user device before the first conversion event, determining a first raw score for the first impression based at least in part on a first viewability of the first impression at the first user device, determining a first set of efficacy attributes for the first impression, determining a first weighted score for the first impression based at least in part on the first raw score and the first set of efficacy attributes, and attributing the first conversion event to the first impression based at least in part on the first weighted score.

19 Claims, 6 Drawing Sheets

(56) References Cited

U.S. PATENT DOCUMENTS

| | | | | |
|---|---|---|---|---|
| 2011/0307331 | A1* | 12/2011 | Richard et al. | G06Q 30/00 |
| | | | | 705/14.45 |
| 2013/0157244 | A1* | 6/2013 | Eger et al. | G06Q 30/02 |
| | | | | 434/350 |
| 2014/0136271 | A1* | 5/2014 | Rangarajan et al. | |
| | | | | G06Q 10/06315 |
| | | | | 705/7.25 |
| 2015/0161653 | A1* | 6/2015 | Raichelgauz et al. | |
| | | | | H04N 7/17318 |
| | | | | 705/14.41 |
| 2016/0086215 | A1* | 3/2016 | Wang et al. | G06Q 30/0275 |
| | | | | 705/14.45 |
| 2016/0189177 | A1* | 6/2016 | Parpia et al. | G06Q 30/0202 |
| | | | | 705/7.31 |
| 2016/0189278 | A1* | 6/2016 | Parpia et al. | G06Q 30/0635 |
| | | | | 705/26.81 |
| 2021/0303653 | A1* | 9/2021 | Choi et al. | G06Q 30/0275 |

OTHER PUBLICATIONS

Prassad Chalasani; Counterfactual-based Incrementality Measurement in a Digital Platform; CMU; 44 pages; May 04, 2017.*

* cited by examiner

ATTRIBUTING CONVERSION EVENTS TO VIEWABLE CONTENT IMPRESSIONS USING MULTIPLE EFFICACY ATTRIBUTES

BACKGROUND

Content may be presented on electronic devices to users such that users can consume the content. Users may consume or interact with certain content while other content may not be consumed or interacted with. Similarly, certain users may interact with certain content, while other users may not interact with the same content. In many instances, multiple pieces of content may be presented at respective delivery slots at a webpage. Upon loading of a webpage on a user device, certain content impressions may be positioned within a visible area of the browser window and thus viewable at the user device, while other content impressions may be positioned outside of the visible area absent the user scrolling through the webpage. In some instances, impressions of multiple pieces of content of a single content campaign for a product or service may be presented at different webpages on a user device over a time period, and the user may subsequently engage in a conversion event related to the product or service. In such instances, it may be difficult to attribute the conversion event to one of the content impressions for the content campaign. Determining efficacy attributes for viewable content impressions presented at user devices may result in improved accuracy in attributing conversion events to content impressions, which may allow campaign managers to more efficiently manage content campaigns.

Figure 1A:
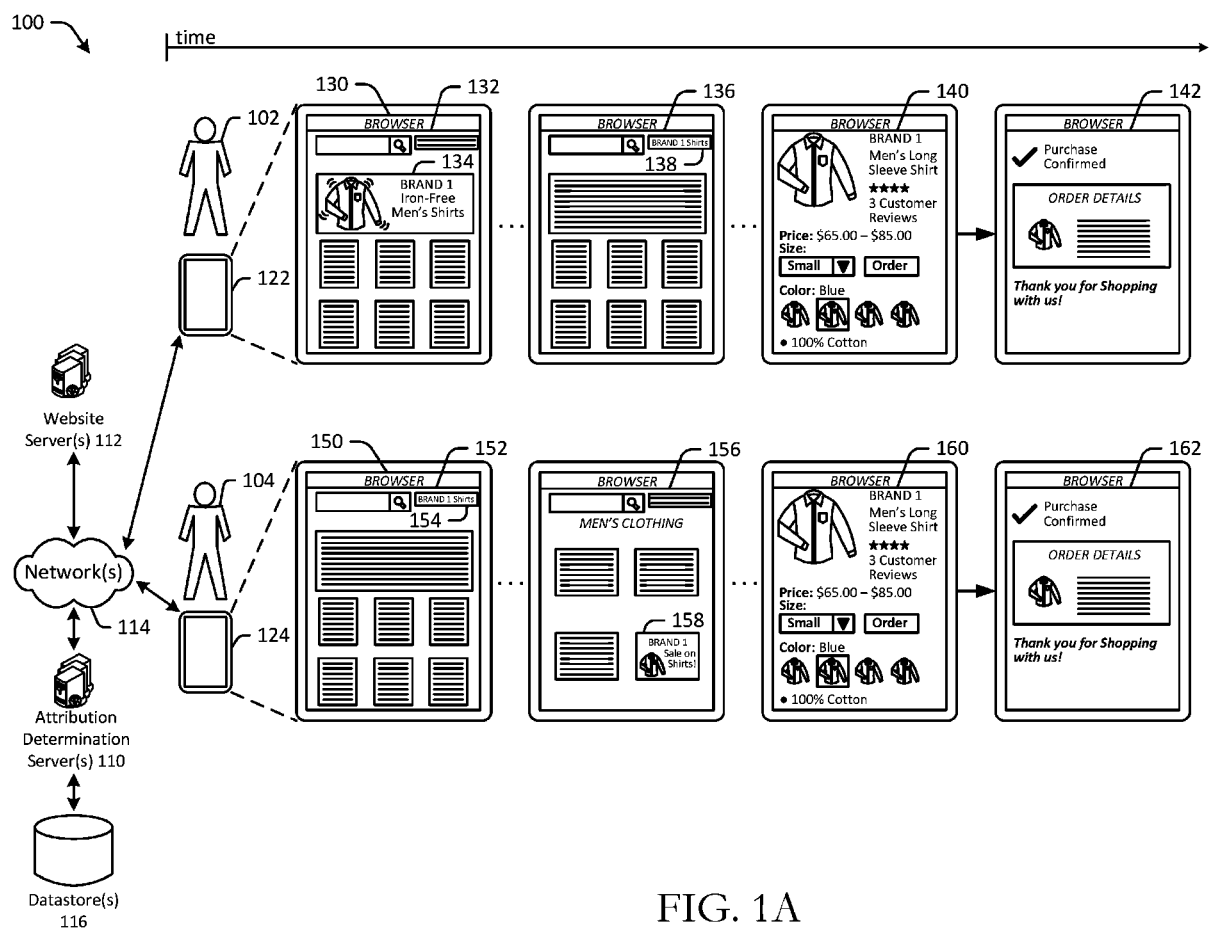
FIG. 1A is a hybrid system and user interface diagram illustrating attributing conversion events to viewable content impressions using multiple efficacy attributes in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users of the electronic devices may consume or interact with the digital content. Content for delivery may include content such as text, images, videos, audio, interactive content, and other types of digital content. Users may consume or interact with certain content while other content may not be consumed or interacted with. Certain content presented at a webpage or in an application may include interactive content, and users may consume additional content which may be accessed, reached, or presented upon interaction with the presented content. For example, users may play a video game, watch a movie, or listen to audio upon interaction with the presented content. Some content may include images, videos, audio, or interactive content for particular products as well as additional product related information. For example, certain content presented at a webpage or in an application may include images, videos, audio, or interactive content related to a particular product or service offered for sale along with information related to the product or service offering. As another example, certain content may include a promotional offer for a particular product or service. Content may be provided as part of content campaigns by content creators that desire for the content to be consumed or interacted with by users. In some instances, delivery of content may be scheduled based at least in part on content delivery settings provided by campaign managers and/or content creators. Content delivery settings may include targeting criteria, frequency constraints (e.g., how often a content impression can be presented to a user, etc.), pacing settings (e.g., smooth or linear delivery, time of day delivery, etc.), device type settings (e.g., devices at which impressions are to be served), and the like.

Campaign managers and/or content creators may provide initial content delivery settings for content associated with a content campaign. The content campaign may include one or more pieces of content, such as different creative materials or different forms or types of content, impressions of which may be delivered or presented to users at electronic devices. One or more remote servers may manage delivery and/or presentation of a set of content over the course of a content campaign. Campaign managers and/or content creators may manage content delivery settings based at least in part on an expected value that can be derived from serving a content impression to a user. The expected value may be used to determine an amount to pay, such as a bid amount, in order to serve a content impression to a user, and/or for user interactions with served impressions, such as clicks, taps, swipes, etc. In order to optimize usage or expenditure of resources allocated towards content served at electronic devices, campaign managers and/or content creators may desire to determine an accurate value for user viewing, user consumption, and/or user interaction with content presented at electronic devices. Based at least in part on the determination, campaign managers and/or content creators may determine whether or not to change content delivery settings for a particular content campaign.

In many instances, multiple pieces of content may be presented at respective delivery slots at a webpage of a website. Upon loading of a webpage on a user device, certain content impressions may be positioned within a visible area of the browser window, while other content impressions may be positioned outside of the visible area. Accordingly, some of the content impressions may be viewable at the user device, while other content impressions may not be viewable unless the user scrolls through the webpage. In some instances, impressions of multiple pieces of content of a single content campaign for a product or service may be presented at different webpages on a user device over a time period, and the user may subsequently engage in a conversion event related to the product or service. In view of the multiple impressions presented at the user device, it may be difficult to attribute the conversion event to one of the content impressions for the content campaign. In some instances, a deterministic model governed by viewable impressions may be used to attribute conversion events to content impressions related to a particular content campaign. Although this approach may allow for straightforward assignment and explanation of how conversion events map to the last viewable content impression, such practice may create distortions in placement performance because the governance of viewable impressions is arbitrary. By using viewability as the sole governor of attribution, such a deterministic model may not capture other drivers of campaign engagement and may effectively penalize the development of large size creatives and more explorative content page types which may be highly correlated factors to user engagement with content.

Embodiments of the disclosure may provide improved accuracy in attributing conversion events to content impressions related to a particular content campaign. Certain embodiments may determine a set of content of a content campaign for presentation at a user device of a particular user, the content campaign related to a particular product or service. For example, it may be determined that the content campaign includes one or more pieces of content for presentation at the user device. Some embodiments may receive an indication of a conversion event related to the product or service at the user device. Certain embodiments may determine one or more impressions of content of the content campaign at the user device before the conversion event. For example, a transaction history may be accessed to determine that one or more impressions of content of the content campaign were presented at the user device before the conversion event. Some embodiments may determine a raw score for a content impression presented at the user device before the conversion event based at least in part on a viewability of the content impression at the user device. Certain embodiments may determine a set of efficacy attributes for the content impression. For example, a first content size attribute, a first content density attribute, and a first contextual load attribute for the content impression may be determined. Some embodiments may determine a weighted score for the content impression based at least in part on the raw score and the set of efficacy attributes. For example, respective weight values for the efficacy attributes may be determined, and the weighted score may be determined using the raw score and the respective weight values. Certain embodiments may attribute the conversion event to the content impression based at least in part on the weighted score. The process of determining a raw score, determining a set of efficacy attributes, and determining a weighted score for a particular content impression may be carried out with respect to multiple content impressions of a sequence of impressions of content of a particular content campaign. Further, the respective weight values for the efficacy attributes may be updated and refined over time. For example, the respective weight values may be periodically updated and refined based at least in part on click-through data for content having the respective efficacy values.

As a result, in attributing conversion events to content impressions of a content campaign, embodiments of the disclosure may consider viewability of content impressions at a user device while also capturing other drivers of campaign engagement. For example, certain embodiments may determine a raw score for a particular content impression based at least in part on viewability of the impression at the user device, determine efficacy attributes of the content impression, determine a weighted score for the content impression using the raw score and the efficacy attributes, and then determine whether to attribute a conversion event to the content impression based at least in part on the weighted score. In this manner, embodiments of the disclosure may provide improved accuracy in attributing conversion events to content impressions related to a content campaign. As a result, embodiments of the disclosure may provide campaign managers and/or content creators with more accurate feedback with respect to attribution data for content of a particular content campaign. Based on the performance data, campaign managers and/or content creators may determine whether or not to change content delivery settings with respect to the content campaign in order to optimize usage or expenditure of resources allocated towards content served at electronic devices. Further, embodiments of the disclosure may consider changes in performance of content of a particular campaign over time by updating and refining the respective weight values used in determining weighted scores to reflect such performance changes.

The improved attribution accuracy provided by embodiments of the disclosure advantageously may allow campaign managers to more effectively manage cost and overhead with respect to content campaigns. For example, the attribution performance data provided by embodiments of the disclosure may allow campaign managers to present fewer pieces of content for a particular content campaign while still achieving the desired goals of the campaign. In this manner, substantial savings may be achieved with respect to not only cost of the campaign but also content overhead and resources required for carrying out the campaign. It will be appreciated that such advantages may not be realized by a deterministic attribution model that is governed solely by viewability of content impressions. Although a deterministic model may provide a straightforward approach for attributing conversion events to content impressions, such a model may create distortions which may not reflect the actual performance of content of a particular campaign. In contrast, embodiments of the disclosure may provide campaign managers with more accurate attribution performance data, thereby allowing campaign managers to more efficiently and more effectively manage content and realize substantial savings in cost, overhead, and system resources.

This disclosure relates to, among other things, systems, methods, computer-readable media, techniques, and methodologies for attributing conversion events to viewable content impressions using multiple efficacy attributes, which may include one or more machine learning models, predictive algorithms, and the like. Embodiments may determine one or more pieces of content of a content campaign for presentation at a user device of a user. The content campaign may be related to a particular product or service. Embodiments may receive an indication of a conversion event, such as a purchase, related to the product or service by the user at the user device, and then may determine impressions of content of the campaign that were presented at the user device before the conversion event. Embodiments may determine a raw score for a particular content impression based at least in part on a viewability of the impression at the user device, determine efficacy attributes of the content impression, determine a weighted score for the content impression using the raw score and the efficacy attributes, and then determine whether to attribute a conversion event to the content impression based at least in part on the weighted score. One or more attribution models may be used to determine the weighted score for the content impression using respective weight values for the efficacy attributes of the content impression, and the attribution models may be updated, periodically or continuously, to account for changes in content performance over time.

Figure 1B:
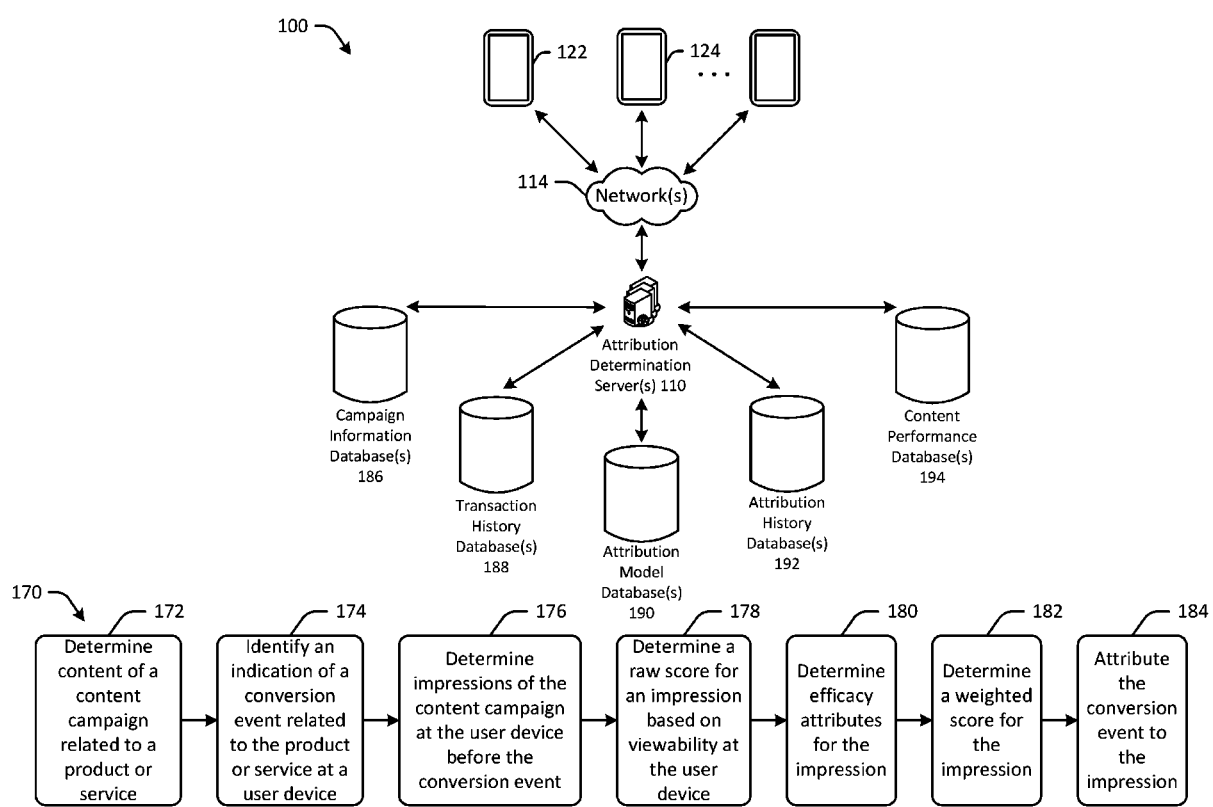
FIG. 1B is a hybrid system and process diagram illustrating attributing conversion events to viewable content impressions using multiple efficacy attributes in accordance with one or more embodiments of the disclosure.

Referring to FIGS. 1A and 1B, an example system 100 illustrating attributing conversion events to viewable content impressions using multiple efficacy attributes. The system 100 may include one or more servers and at least one or a plurality of user devices that connects to the server. In the example of FIGS. 1A and 1B, one or more attribution determination servers 110 may be in communication with one or more user devices. Communication between the attribution determination server 110 and the one or more user devices may be facilitated by one or more networks. The one or more user devices may connect to or communicate with the attribution determination server 110, on a regular or irregular basis, to receive content from or deliver content to the attribution determination server 110. In the example of FIGS. 1A and 1B, one or more website servers 112 also may be in communication with the one or more user devices. Communication between the website server 112 and the one or more user devices may be facilitated by one or more networks. The one or more user devices may connect to or communicate with the website server 112, on a regular or irregular basis, to receive content from or deliver content to the attribution determination server 110. The one or more user devices may be any type of electronic device used by a user to communicate with the attribution determination server 110 and the website server 112. The one or more user devices may communicate with the website server 112 to access one or more websites, such as by executing a web browser on the user device.

In the example of FIGS. 1A and 1B, the attribution determination server 110 may be in communication with a first user device 122 associated with a first user 102, and a second user device 124 associated with a second user 104. Communication between the attribution determination server 110 and the user devices 122, 124 may be facilitated by one or more network(s) 114. The attribution determination server 110 may be in communication with and deliver content to or receive content from any number of user devices. The attribution determination server 110 may use an attribution model to determine attribution of conversion events by the users 102, 104 at the user devices 122, 124 as well as other users in communication with the attribution determination server 110 by user devices. The attribution determination server 110 may be in communication with one or more datastore(s) 116, which may store content campaign information, transaction history information, one or more attribution models, attribution history information, content performance information, and other information accessible to the attribution determination server 110.

The first user device 122 may connect to the one or more networks 114 and receive digital content for presentation at the first user device 122. For example, the first user device 122 may communicate with the website server 112 to access a website, such as a retail website, by executing a web browser on the first user device 122. In the example of FIG. 1A, the first user 102 may access a first webpage 132 of a website, and digital content may be presented at the first user device 122. The digital content may be any suitable content, such as text, images, videos, audio, interactive content, and other content. In some instances, the content may include multiple pieces of content for presentation at respective content delivery slots at the webpage. Certain content impressions may be positioned within a visible area of a browser window 130 of the first user device 122, while other content impressions may be positioned outside of the visible area of the browser window 130 absent the first user 102 scrolling through the first webpage 132. The digital content presented at the first webpage 132 may include first content of a content campaign related to a particular product or service. In the example of FIG. 1A, the digital content presented at the first webpage 132 may include first content 134 of a first content campaign related to a product offered for sale, such as a men's shirt. The first content 134 may include a video of the product as well as text related to additional product related information. For example, the product related information may include a brand name of the product (e.g., "BRAND 1"), a department of the product (e.g., "Men's"), a product type (e.g., "Shirt"), and one or more attributes of the product (e.g., "Iron-Free"). In the example of FIG. 1A, the first content 134 may be positioned within the visible area of the browser window 130 such that the first user 102 may view the impression of the first content 134.

An impression of a piece of content presented at a user device may have a number of efficacy attributes which may correlate to performance of the content. For example, the efficacy attributes for the content impression may include a content size attribute, a content density attribute, a contextual load attribute, a content dimension attribute, a dwell time attribute, and/or an elapsed time attribute. The content size attribute may relate to a size, such as a relative size or a total pixel size, of the content impression. For example, a content size attribute for a content impression may be "small," "medium," or "large." The content density attribute may relate to a relative density of the pieces of content presented at the webpage. In other words, the content density attribute may relate to an amount of content adjacent the content impression of interest. For example, a content density attribute for a content impression may be "content light" when a minimal amount of adjacent content is presented at a webpage, "content moderate" when a moderate amount of adjacent content is presented at a webpage, or "content heavy" when a substantial amount of adjacent content is presented at a webpage. The contextual load attribute may relate to a nature of the pieces of content presented at the webpage and/or a user's mindset when landing on the webpage. For example, a contextual load attribute for a content impression may be "focused" when multiple or all pieces of content presented at a webpage relate to products or services of the same or similar category or type, which may indicate that a user landing on the webpage is particularly interested in that category or type of product or service. As another example, a contextual load attribute for a content impression may be "explorative" when pieces of content presented at a webpage relate to products or services of a wide variety of categories or types, which may indicate that a user landing on the webpage is open to exploring content in a variety of categories or types of products or services. The content dimension attribute may relate to particular dimensions of the content impression, which may be measured in pixels or other units of measurement. For example, a content dimension attribute for a content impression may be "300 pixels wide by 250 pixels tall" or "728 pixels wide by 90 pixels tall." The dwell time attribute may relate to a time period throughout which the content impression is visible at the user device. For example, a dwell time attribute for a content impression may be "0.5 seconds," "10 seconds," or "1 minute." The elapsed time attribute may relate to an amount of time elapsed between the presentation of the content impression and a subsequent conversion event related to a product or service of the respective content campaign. For example, an elapsed time attribute for a content impression may be "5 minutes," "10 hours," or "12 days."

The impression of the first content 134 presented at the first user device 122 may have a number of efficacy attributes which may correlate to performance of the first content 134. In the example of FIG. 1A, the impression of the first content 134 at the first user device 122 may have a first content size attribute of "large" based on a relatively large size of the content impression as compared to other content impressions presented at the first webpage 132. The impression of the first content 134 also may have a first content density attribute of "content heavy" based on a substantial amount of adjacent content presented at the first webpage 132. Additionally, the impression of the first content 134 may have a contextual load attribute of "explorative" based on the pieces of content presented at the first webpage 132 relating to products or services of a wide variety of categories or types. The impression of the first content 134 may have a first content dimension attribute of "728 pixels wide by 90 pixels tall." Further, the impression of the first content 134 may have a first dwell time attribute of "10 seconds" based on the impression being visible at the first user device 122 for 10 seconds. A timestamp of the presentation of the impression of the first content 134 may be generated and stored for later use in determining a first elapsed time attribute for the impression with respect to a subsequent conversion event.

In the example of FIG. 1A, the first user 102 may subsequently access a second webpage 136 of the website, and digital content may be presented at the first user device 122. A first time period may elapse between the first user 102 accessing the first webpage 132 and the first user 102 accessing the second webpage 136. In some instances, the first time period may span a number of minutes, a number of hours, a number of days, or a number of weeks. The digital content presented at the second webpage 136 may include second content of the content campaign related to the particular product or service. In the example of FIG. 1A, the digital content presented at the second webpage 136 may include second content 138 of the first content campaign related to the men's shirt. The second content 138 may include only text providing product related information. For example, the product related information may include the brand name of the product (e.g., "BRAND 1") and the product type (e.g., "Shirts"). In the example of FIG. 1A, the second content 138 may be positioned within the visible area of the browser window 130 such that the first user 102 may view the impression of the second content 138.

The impression of the second content 138 presented at the first user device 122 may have a number of efficacy attributes which may correlate to performance of the second content 138. In the example of FIG. 1A, the impression of the second content 138 at the first user device 122 may have a second content size attribute of "small" based on a relatively small size of the content impression as compared to other content impressions presented at the second webpage 136. The impression of the second content 138 also may have a second content density attribute of "content heavy" based on a substantial amount of adjacent content presented at the second webpage 136. Additionally, the impression of the second content 138 may have a contextual load attribute of "explorative" based on the pieces of content presented at the second webpage 136 relating to products or services of a wide variety of categories or types. The impression of the second content 138 may have a second content dimension attribute of "120 pixels wide by 30 pixels tall." Further, the impression of the second content 138 may have a second dwell time attribute of "2 seconds" based on the impression being visible at the first user device 122 for 2 seconds. A timestamp of the presentation of the impression of the second content 138 may be generated and stored for later use in determining a second elapsed time attribute for the impression with respect to a subsequent conversion event.

In the example of FIG. 1A, the first user 102 may subsequently access a third webpage 140 of the website, and digital content may be presented at the first user device 122. A second time period may elapse between the first user 102 accessing the second webpage 136 and the first user 102 accessing the third webpage 140. In some instances, the second time period may span a number of minutes, a number of hours, a number of days, or a number of weeks. The third webpage 140 may be a detail page for the particular product or service, and the digital content presented at the third webpage 140 may include detailed product related information for the particular product or service. In the example of FIG. 1A, the digital content presented at the third webpage 140 may include an image of the men's shirt as well as the brand name of the product (e.g., "BRAND 1"), the department of the product (e.g., "Men's"), the product type (e.g., "Shirt"), a user rating of the product (e.g., a number of stars), a product price or price range (e.g., "$65.00 - $85.00), available sizes (e.g., "Small"), available colors (e.g., "Blue"), and/or other information related to the product.

The first user 102 may subsequently interact with the digital content presented at the third webpage 140 and engage in a first conversion event related to the particular product or service. In the example of FIG. 1A, the first conversion event may include the first user 102 purchasing the men's shirt. In other instances, the first conversion event may include the first user 102 placing the particular product or service in a shopping cart or performing another type of conversion event related to the product or service. In the example of FIG. 1A, upon submitting a purchase request, the first user 102 may access a fourth webpage 142, and digital content may be presented at the first user device 122. The digital content presented at the fourth webpage 142 may include a purchase confirmation indicating that the purchase request was received and confirming details of the purchase by the first user 102. A timestamp of the purchase may be generated and stored for later use in determining the respective elapsed time attributes for the impressions of the first content 134 and the second content 138.

In a similar manner, the second user device 124 may connect to the one or more networks 114 and receive digital content for presentation at the second user device 124. For example, the second user device 124 may communicate with the website server 112 to access the website by executing a web browser on the second user device 124. In the example of FIG. 1A, the second user 104 may access a fifth webpage 152 of the website, and digital content may be presented at the second user device 124. The digital content may be any suitable content, such as text, images, videos, audio, and other content. In some instances, the content may include multiple pieces of content for presentation at respective content delivery slots at the webpage. Certain content impressions may be positioned within a visible area of a browser window 150 of the second user device 124, while other content impressions may be positioned outside of the visible area of the browser window 150 absent the second user 104 scrolling through the fifth webpage 152. The digital content presented at the fifth webpage 152 may include third content of the content campaign related to the particular product or service. In the example of FIG. 1A, the digital content presented at the fifth webpage 152 may include third content 154 of the first content campaign related to men's shirt. The third content 154 may include only text providing product related information. For example, the product related information may include the brand name of the product (e.g., "BRAND 1") and the product type (e.g., "Shirts"). In some instances, the third content 154 may be the same as the second content 138 presented at the second webpage 136 at the first user device 122. In the example of FIG. 1A, the third content 154 may be positioned within the visible area of the browser window 150 such that the second user 104 may view the impression of the third content 154.

The impression of the third content 154 presented at the second user device 124 may have a number of efficacy attributes which may correlate to performance of the third content 154. In the example of FIG. 1A, the impression of the third content 154 at the second user device 124 may have a third content size attribute of "small" based on a relatively small size of the content impression as compared to other content impressions presented at the fifth webpage 152. The impression of the third content 154 also may have a third content density attribute of "contentheavy" based on a substantial amount of adjacent content presented at the fifth webpage 152. Additionally, the impression of the third content 154 may have a contextual load attribute of "explorative" based on the pieces of content presented at the fifth webpage 152 relating to products or services of a wide variety of categories or types. The impression of the third content 154 may have a third content dimension attribute of "120 pixels wide by 30 pixels tall." Further, the impression of the third content 154 may have a third dwell time attribute of "5 seconds" based on the impression being visible at the second user device 124 for 5 seconds. A timestamp of the presentation of the impression of the third content 154 may be generated and stored for later use in determining a third elapsed time attribute for the impression with respect to a subsequent conversion event.

In the example of FIG. 1A, the second user 104 may subsequently access a sixth webpage 156 of the website, and digital content may be presented at the second user device 124. A third time period may elapse between the second user 104 accessing the fifth webpage 152 and the second user 104 accessing the sixth webpage 156. In some instances, the third time period may span a number of minutes, a number of hours, a number of days, or a number of weeks. The digital content presented at the sixth webpage 156 may include fourth content of the content campaign related to the particular product or service. In the example of FIG. 1A, the digital content presented at the second webpage 156 may include fourth content 158 of the first content campaign related to the men's shirt. The fourth content 158 may include an image of the product as well as text related to additional product related information. For example, the product related information may include the brand name of the product (e.g., "BRAND 1"), the product type (e.g., "Shirts"), and an indication of a promotional offer for the product (e.g., "Sale"). In the example of FIG. 1A, the fourth content 158 may be positioned within the visible area of the browser window 150 such that the second user 104 may view the impression of the fourth content 158.

The impression of the fourth content 158 presented at the second user device 124 may have a number of efficacy attributes which may correlate to performance of the fourth content 158. In the example of FIG. 1A, the impression of the fourth content 158 at the second user device 124 may have a fourth content size attribute of "medium" based on a relatively moderate size of the content impression as compared to other content impressions presented at the sixth webpage 156, a fourth content density attribute of "content moderate" based on a moderate amount of adjacent content presented at the sixth webpage 156, and a fourth contextual load attribute of "focused" based on multiple or all of the pieces of content presented at the sixth webpage 156 relating to products of the same category (e.g., "Men's Clothing"). The impression of the fourth content 158 may have a fourth content dimension attribute of "300 pixels wide by 250 pixels tall." Further, the impression of the fourth content 158 may have a fourth dwell time attribute of "30 seconds" based on the impression being visible at the second user device 124 for 30 seconds. A timestamp of the presentation of the impression of the fourth content 158 may be generated and stored for later use in determining a fourth elapsed time attribute for the impression with respect to a subsequent conversion event.

In the example of FIG. 1A, the second user 104 may subsequently access a seventh webpage 160 of the website, and digital content may be presented at the second user device 124. A fourth time period may elapse between the second user 104 accessing the sixth webpage 156 and the second user 104 accessing the seventh webpage 160. In some instances, the fourth time period may span a number of minutes, a number of hours, a number of days, or a number of weeks. The seventh webpage 160 may be a detail page for the particular product or service, and the digital content presented at the third webpage 140 may include detailed product related information for the particular product or service.

The second user 104 may subsequently interact with the digital content presented at the seventh webpage 160 and engage in a second conversion event related to the particular product or service. In the example of FIG. 1A, the second conversion event may include the second user 104 purchasing the men's shirt. Upon submitting a purchase request, the second user 104 may access an eighth webpage 162, and digital content may be presented at the second user device 124. The digital content presented at the eighth webpage 162 may include a purchase confirmation indicating that the purchase request was received and confirming details of the purchase by the second user 104. A timestamp of the purchase may be generated and stored for later use in determining the respective elapsed time attributes for the impressions of the third content 154 and the fourth content 158.

To determine attribution of conversion events related to a particular product or service by users, such as the first conversion event by the first user 102 or the second conversion event by the second user 104, the attribution determination server 110 may execute one or more process flows. For example, an example process flow 170 for attributing conversion events to viewable content impressions using multiple efficacy attributes is depicted in FIG. 1B.

At block 172 of the process flow 170, the attribution determination server 110 may determine content of a content campaign for presentation at user devices. The content campaign may be related to a particular product or service. The content of the content campaign may include first content and second content related to the product or service. In some instances, the content of the content campaign may include a set of content including any number of pieces of content related to the product or service. In some embodiments, the attribution determination server 110 may determine the content of a content campaign using one or more campaign information database(s) 186 accessible to the attribution determination server 110. The campaign information database 186 may store content campaign information identifying the respective pieces of content of numerous content campaigns. For example, one or more mapping tables may be stored at the campaign information database 186 and accessible to the attribution determination server 110 for use in determining the content of a content campaign related to a particular product or service. The mapping table may include respective lists of unique product or service identifiers, unique content campaign identifiers, and unique content identifiers, with the respective lists identified for mapping purposes. In this manner, when a particular product or service is known, the mapping table may be used to determine a content campaign related to the product or service as well as all content identifiers for the content of the content campaign. The identifiers may be identification numbers or other values.

At block 174 of the process flow 170, the attribution determination server 110 may identify an indication of a conversion event related to the product or service at a user device by a user. In some instances, the conversion event may include a purchase of the product or service by the user. In other instances, the conversion event may include the user placing the product or service in a shopping cart. In some embodiments, the attribution determination server 110 may receive an indication of the conversion event from the website server 112. The indication of the conversion event may be a purchase confirmation for a particular purchase by the user or a purchase log for multiple purchases by multiple users. In some embodiments, the indication of the conversion event may include a unique product or service identifier for the product or service, a unique device identifier for the user device, and a timestamp for the conversion event.

At block 176 of the process flow 170, the attribution determination server 110 may determine that one or more impressions of content of the content campaign were presented at the user device before the conversion event. For example, the attribution determination server 110 may determine a sequence of impressions of content of the content campaign presented at the user device before the conversion event. In some embodiments, the attribution determination server 110 may determine the sequence of impressions presented at the user device before the conversion event using one or more transaction history database(s) 188 accessible to the attribution determination server 110. The transaction history database 188 may store transaction information relating to content impressions presented at user devices and user interaction with such content impressions. For example, the transaction information may include respective transaction entries for each content impression presented at a user device. Each transaction entry may include a unique content identifier for the respective content, an indication that the content impression was presented at the user device, a unique device identifier for the user device, a unique product or service identifier for the product or service, and a timestamp for the presentation of the content impression. In this manner, the attribution determination server 110 may determine the sequence of impressions presented at the user device before the conversion event using the product or service identifier, the timestamp for the conversion event, and the timestamps for the respective presentations of the content impressions. In some embodiments, each transaction entry may include an indication that the content was consumable or that the content was not consumable at the user device. For example, each transaction entry may include an indication that the content impression was viewable or that the content impression was not viewable at the user device. Consumability of content, or viewability of a content impression, at a user device may be determined by one or more governance standards. In some embodiments, content may be determined to be consumable when an entire amount of the content was presented at the user device. For example, in some embodiments, a content impression may be determined to be viewable when 100 percent of the content was presented or visible at the user device. In some embodiments, content may be determined to be consumable when at least a certain amount of the content was presented at the user device. For example, in some embodiments, a content impression may be determined to be viewable when at least 50 percent of the content was presented or visible at the user device for at least one second. Still other governance standards for determining consumability or viewability may be used. In some embodiments, each transaction entry may include an indication that the user interacted with the content impression or that the user did not interact with the content impression. For example, each transaction entry may indicate that the user clicked on the content impression or that the user did not click on the content impression. In some embodiments, each transaction entry may include an indication of a dwell time for the content impression at the user device. In other words, the transaction entry may include an indication of a time period throughout which the content impression was presented or visible at the user device. In some embodiments, each transaction entry may include respective efficacy attributes for the content impression. For example, the transaction entry may include a content size attribute, a content density attribute, a contextual load attribute, a content dimension attribute, and a dwell time attribute for the content impression.

At block 178 of the process flow 170, the attribution determination server 110 may determine a raw score for one of the content impressions presented at the user device before the conversion event. In some embodiments, the attribution determination server 110 may determine a raw score for a last presented content impression of the sequence of content impressions. The attribution determination server 110 may determine a raw score for the content impression based at least in part on a viewability of the content impression at the user device. In some embodiments, the attribution determination server 110 may determine that the content impression was viewable or was not viewable at the user device using the transaction history information stored at the transaction history database 188. The raw score for the content impression may be a numerical value, such as a numerical value between zero (0) and one (1). Other ranges of the raw score may be used, such as numerical values between zero (0) and one hundred (100). In some embodiments, if the content impression was viewable at the user device, the attribution determination server 110 may determine that the raw score of the content impression is a numerical value that is closer to one (1) than to zero (0). For example, the raw score for the viewable content impression may be determined to be 0.8. In some embodiments, if the content impression was not viewable at the user device, the attribution determination server 110 may determine that the raw score of the content impression is a numerical value that is closer to zero (0) than to one (1). For example, the raw score for the non-viewable content impression may be determined to be 0.2. In some embodiments, if the content impression was not viewable at the user device, the attribution determination server 110 may then determine a raw score for a next last presented content impression of the sequence of content impressions and may proceed to block 180 only if the content impression was viewable at the user device.

At block 180 of the process flow 170, the attribution determination server 110 may determine a set of efficacy attributes for the content impression. The set of efficacy attributes may include two or more efficacy attributes for the content impression. As described above, example efficacy attributes may include a content size attribute, a content density attribute, a contextual load attribute, a content dimension attribute, a dwell time attribute, and an elapsed time attribute. In some embodiments, the attribution determination server 110 may determine the efficacy attributes for the content impression using the transaction history information stored at the transaction history database 188. For example, the attribution determination server 110 may access one or more entries stored at the transaction history database 188 to determine the content size attribute, the content density attribute, the contextual load attribute, the content dimension attribute, and the dwell time attribute for the content impression. The attribution determination server 110 may determine the elapsed time attribute for the content impression using the timestamp for the presentation of the impression and the timestamp for the conversion event. For example, the attribution determination server 110 may calculate the elapsed time attribute by determining a difference between the timestamp for the presentation of the impression and the timestamp for the conversion event.

At block 182 of the process flow 170, the attribution determination server 110 may determine a weighted score for the content impression. The weighted score for the content impression may be determined based at least in part on the raw score for the content impression and the efficacy attributes for the content impression. In some embodiments, the attribution determination server 110 may determine the weighted score using one or more attribution models. The attribution models may be stored at one or more attribution model database(s) 190 accessible to the attribution determination server 110. The attribution models may include respective weight values for the efficacy attributes for the content impression, which may be used in combination with the raw score to determine the weighted score for the content impression. In some embodiments, the weight values may be numerical values between zero (0) and one (1), or between negative one (-1) and one (1), although other ranges of numerical values may be used. In some embodiments, the weighted score may be calculated by determining a first weight value for a first efficacy attribute of the content impression, determining a second weight value for a second efficacy attribute of the content impression, and determining the weighted score using the raw score, the first weight value, and the second weight value. In some embodiments, the weighted score may be determined by multiplying the raw score by the first weight value and the second weight value, for example, when the weight values are numerical values between zero (0) and one (1). In some embodiments, the weighted score may be determined by calculating a sum of the raw score, the first weight value, and the second weight value, for example, when the weight values are numerical values between negative one (-1) and one (1). Any number of efficacy attributes and thus any number of weight values may be used in determining the weighted score for the content impression. The weighted score for the content impression may be a numerical value between zero (0) and one (1). Other ranges of the weighted score may be used, such as numerical values between zero (0) and one hundred (100).

At block 184 of the process flow 170, the attribution determination server 110 may attribute the conversion event to the content impression based at least in part on the weighted score for the content impression. In some embodiments, the weighted score for the content impression may be compared with a randomly generated value to determine attribution of the conversion event to the content impression. The attribution determination server 110 may determine a randomly generated value, for example, using a random value generator. In some embodiments, the randomly generated value may be a numerical value between zero (0) and one (1), and the weighted score for the content impression may be a numerical value between zero (0) and one (1), although other numerical value ranges may be used. In some embodiments, the randomly generated value may be a numerical value between zero (0) and one hundred (100), and the weighted score for the content impression may be a numerical value between zero (0) and one hundred (100). The attribution determination server 110 may determine whether the weighted score for the content impression is greater than, equal to, or less than the randomly generated value. In some embodiments, if the attribution determination server 110 determines that the weighted score for the content impression is greater than or equal to the randomly generated value, the attribution determination server 110 may attribute the conversion event to the content impression. In some embodiments, if the attribution determination server 110 determines that the weighted score for the content impression is less than the randomly generated value, the attribution determination server 110 may not attribute the conversion event to the content impression.

In some embodiments, the attribution determination server 110 may generate a record of the attribution of the conversion event to the content impression or otherwise cause a record of the attribution to be generated. In some embodiments, the record of attribution of the conversion event to the content impression may be stored as an entry in one or more attribution history database(s) 192 accessible to the attribution determination server 110. In some embodiments, attribution entries stored at the attribution history database 192 may be used to generate an attribution performance report for one or more pieces of content of a content campaign. For example, the attribution determination server 110 may generate an attribution performance report for one or more pieces of content of a content campaign over a time period. The performance report may include one or more performance metrics based at least in part on a number of conversion events attributed to impressions of the one or more pieces of content over the time period, which may allow a campaign manager to more efficiently manage the respective content campaign.

In some embodiments, the attribution determination server 110 may update the one or more attribution models based at least in part on performance data for one or more pieces of content over a time period. For example, the attribution determination server 110 may update the respective weight values for the efficacy attributes based at least in part on performance data for one or more pieces of content of one or more content campaigns over a time period. In some embodiments, the attribution determination server 110 may update the one or more attribution models periodically at regular or irregular time intervals. For example, the attribution determination server 110 may update the one or more attribution models on a daily basis. In some embodiments, the performance data used in updating the attribution models may be non-ambiguous data, such as click-through data. For example, the attribution determination server 110 may update the one or more attribution models based at least in part on a click-through distribution for one or more pieces of content of one or more content campaigns over a time period. As another example, the attribution determination server 110 may update the one or more attribution models based at least in part on respective click-through rates for one or more pieces of content of one or more content campaigns over a time period.

By implementing the process of determining a raw score for a particular content impression based at least in part on a viewability of the impression at the user device, determining efficacy attributes of the content impression, determining a weighted score for the content impression using the raw score and the efficacy attributes, and determining whether to attribute a conversion event to the content impression based at least in part on the weighted score, embodiments of the disclosure may provide improved accuracy in attributing conversion events to content impressions related to a particular content campaign.

As a result, embodiments of the disclosure may provide campaign managers and/or content creators with more accurate feedback with respect to performance data for content of a particular content campaign. Based on the attribution performance data, campaign managers and/or content creators may determine whether or not to change content delivery settings with respect to the content campaign in order to optimize usage or expenditure of resources allocated towards content served at electronic devices. Further, embodiments of the disclosure may consider changes in performance of content of a particular campaign over time by updating and refining the respective weight values used in determining weighted scores to reflect such performance changes.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
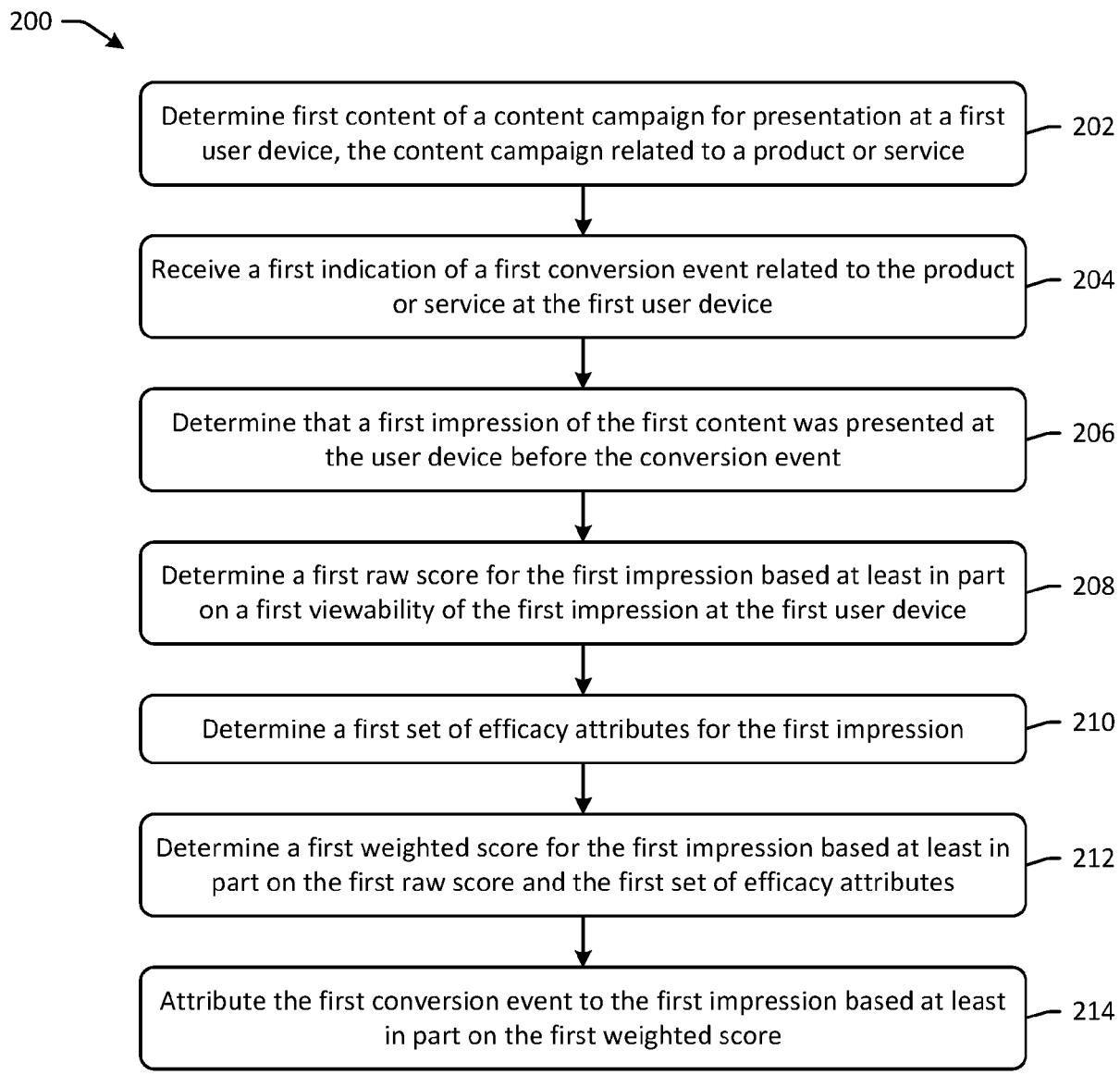
FIG. 2 is an example process flow diagram for attributing conversion events to viewable content impressions using multiple efficacy attributes in accordance with one or more embodiments of the disclosure.

Referring to FIG. 2, an example process flow 200 for attributing conversion events to viewable content impressions using multiple efficacy attributes in accordance with one or more embodiments of the disclosure is depicted. Although certain operations are illustrated as occurring separately in FIG. 2, some or all of the operations may occur concurrently or partially concurrently across one or more computer systems. In some embodiments, the operations of the process flow 200 may be executed by a remote server, such as an attribution determination server.

At block 202 of the process flow 200, first content of a content campaign for presentation at a user device may be determined, the content campaign related to a product or service. For example, computer-executable instructions of one or more attribution determination module(s) stored at a server may be executed to determine first content of a content campaign for presentation at a user device. The content campaign may include, in addition to the first content, second content related to the product or service. The content campaign may include any number of pieces of content related to the product or service. In some embodiments, a server, such as an attribution determination server, may determine first content of a content campaign for presentation at a user device.

At block 204 of the process flow 200, an indication of a first conversion event related to the product or service at the user device may be received. For example, computer-executable instructions of one or more attribution determination module(s) stored at a server may be executed to receive an indication of a first conversion event related to the product or service at the user device. In some embodiments, a server, such as an attribution determination server, may receive an indication of a first conversion event related to the product or service at the user device.

At block 206 of the process flow 200, it may be determined that a first impression of the first content was presented at the user device before the conversion event. For example, computer-executable instructions of one or more attribution determination module(s) stored at a server may be executed to determine that a first impression of the first content was presented at the user device before the conversion event. In some embodiments, a server, such as an attribution determination server, may determine that a first impression of the first content was presented at the user device before the conversion event.

At block 208 of the process flow 200, a first raw score for the first impression may be determined based at least in part on a first viewability of the first impression at the user device. For example, computer-executable instructions of one or more attribution determination module(s) stored at a server may be executed to determine a first raw score for the first impression based at least in part on a first viewability of the first impression at the user device. In some embodiments, a server, such as an attribution determination server, may determine a first raw score for the first impression based at least in part on a first viewability of the first impression at the user device.

At block 210 of the process flow 200, a first set of efficacy attributes for the first impression may be determined. For example, computer-executable instructions of one or more attribution determination module(s) stored at a server may be executed to determine a first set of efficacy attributes for the first impression. In some instances, the first set of efficacy attributes may include a first content size attribute for the first impression, a first content density attribute for the first impression, and a first contextual load attribute for the first impression. In some instances, the first set of efficacy attributes may include a first content dimension attribute for the first impression or a first dwell time attribute for the first impression. The first set of efficacy attributes may include any number of efficacy attributes for the first impression. In some embodiments, a server, such as an attribution determination server, may determine a first set of efficacy attributes for the first impression.

At block 212 of the process flow 200, a first weighted score for the first impression may be determined based at least in part on the first raw score and the first set of efficacy attributes. For example, computer-executable instructions of one or more attribution determination module(s) stored at a server may be executed to determine a first weighted score for the first impression based at least in part on the first raw score and the first set of efficacy attributes. In some embodiments, a server, such as an attribution determination server, may determine a first weighted score for the first impression based at least in part on the first raw score and the first set of efficacy attributes.

At block 214 of the process flow 200, the conversion event may be attributed to the first impression based at least in part on the first weighted score. For example, computer-executable instructions of one or more attribution determination module(s) stored at a server may be executed to attribute the conversion event to the first impression based at least in part on the first weighted score. In some embodiments, a server, such as an attribution determination server, may attribute the conversion event to the first impression based at least in part on the first weighted score.

Figure 3:
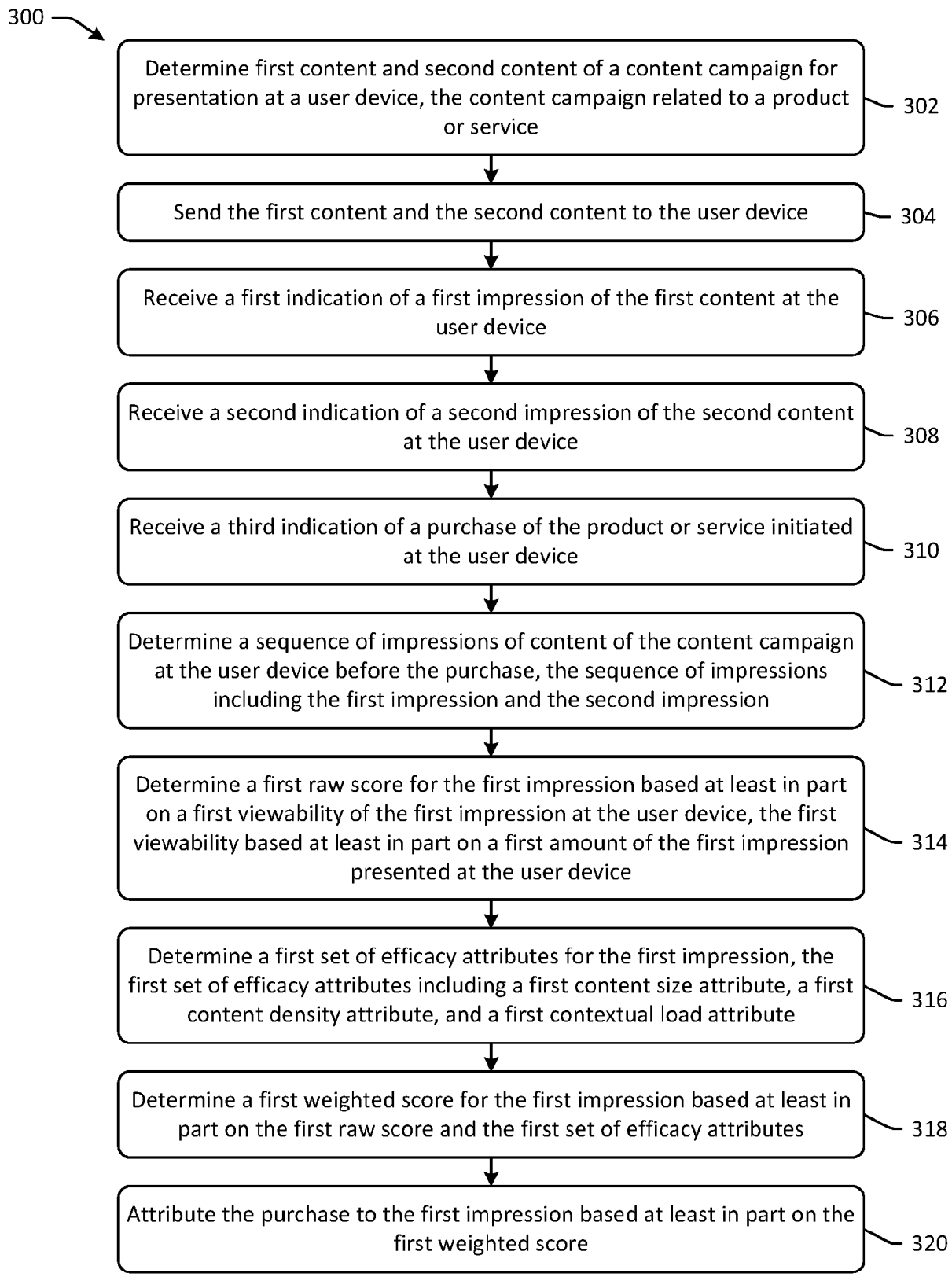
FIG. 3 is an example process flow diagram for attributing conversion events to viewable content impressions using multiple efficacy attributes in accordance with one or more embodiments of the disclosure.

FIG. 3 depicts an example process flow 300 for attributing conversion events to viewable content impressions using multiple efficacy attributes in accordance with one or more embodiments of the disclosure. Although certain operations are illustrated as occurring separately in FIG. 3, some or all of the operations may occur concurrently or partially concurrently across one or more computer systems. In some embodiments, the operations of the process flow 300 may be executed by a remote server, such as an attribution determination server.

At block 302 of the process flow 300, first content and second content of a content campaign for presentation at a user device may be determined, the content campaign related to a product or service. For example, computer-executable instructions of one or more attribution determination module(s) stored at a server may be executed to determine first content and second content of a content campaign for presentation at a user device. The content campaign may include, in addition to the first content and the second content, third content related to the product or service. The content campaign may include any number of pieces of content related to the product or service. In some embodiments, a server, such as an attribution determination server, may determine first content and second content of a content campaign for presentation at a user device.

At block 304 of the process flow 300, the first content and the second content may be sent to the user device. For example, computer-executable instructions of one or more attribution determination module(s) stored at a server may be executed to send the first content and the second content to the user device. In some embodiments, a server, such as an attribution determination server, may send the first content and the second content to the user device.

At block 306 of the process flow 300, a first indication of a first impression of the first content at the user device may be received. For example, computer-executable instructions of one or more attribution determination module(s) stored at a server may be executed to receive a first indication of a first impression of the first content at the user device. In some embodiments, a server, such as an attribution determination server, may receive a first indication of a first impression of the first content at the user device.

At block 308 of the process flow 300, a second indication of a second impression of the second content at the user device may be received. For example, computer-executable instructions of one or more attribution determination module(s) stored at a server may be executed to receive a second indication of a second impression of the second content at the user device. In some embodiments, a server, such as an attribution determination server, may receive a second indication of a second impression of the second content at the user device.

At block 310 of the process flow 300, a third indication of a purchase of the product or service initiated at the user device may be received. For example, computer-executable instructions of one or more attribution determination module(s) stored at a server may be executed to receive a third indication of a purchase of the product or service initiated at the user device. In some embodiments, a server, such as an attribution determination server, may receive a third indication of a purchase of the product or service initiated at the user device.

At block 312 of the process flow 300, a sequence of impressions of content of the content campaign at the user device before the purchase may be determined, the sequence of impressions including the first impression and the second impression. For example, computer-executable instructions of one or more attribution determination module(s) stored at a server may be executed to determine a sequence of impressions of content of the content campaign at the user device before the purchase. The sequence of impressions may include the first impression of the first content and the second impression of the second content. The sequence of impressions may include any number of impressions of any number of pieces of content of the content campaign at the user device before the purchase. In some embodiments, a server, such as an attribution determination server, may determine a sequence of impressions of content of the content campaign at the user device before the purchase.

At block 314 of the process flow 300, a first raw score for the first impression may be determined based at least in part on a first viewability of the first impression at the user device, the first viewability based at least in part on a first amount of the first impression presented at the user device. For example, computer-executable instructions of one or more attribution determination module(s) stored at a server may be executed to determine a first raw score for the first impression based at least in part on a first viewability of the first impression at the user device. The first viewability may be based at least in part on a first amount of the first impression presented at the user device. In some embodiments, a server, such as an attribution determination server, may determine a first raw score for the first impression based at least in part on a first viewability of the first impression at the user device.

At block 316 of the process flow 300, a first set of efficacy attributes for the first impression may be determined, the first set of efficacy attributes including a first content size attribute, a first content density attribute, and a first contextual load attribute. For example, computer-executable instructions of one or more attribution determination module(s) stored at a server may be executed to determine a first set of efficacy attributes for the first impression. The first set of efficacy attributes may include a first content size attribute for the first impression, a first content density attribute for the first impression, and a first contextual load attribute for the first impression. In some instances, the first set of efficacy attributes also may include a first content dimension attribute for the first impression or a first dwell time attribute for the first impression. The first set of efficacy attributes may include any number of efficacy attributes for the first impression. In some embodiments, a server, such as an attribution determination server, may determine a first set of efficacy attributes for the first impression.

At block 318 of the process flow 300, a first weighted score for the first impression may be determined based at least in part on the first raw score and the first set of efficacy attributes. For example, computer-executable instructions of one or more attribution determination module(s) stored at a server may be executed to determine a first weighted score for the first impression based at least in part on the first raw score and the first set of efficacy attributes. In some embodiments, a server, such as an attribution determination server, may determine a first weighted score for the first impression based at least in part on the first raw score and the first set of efficacy attributes.

At block 320 of the process flow 300, the purchase may be attributed to the first impression based at least in part on the first weighted score. For example, computer-executable instructions of one or more attribution determination module(s) stored at a server may be executed to attribute the purchase to the first impression based at least in part on the first weighted score. In some embodiments, a server, such as an attribution determination server, may attribute the purchase to the first impression based at least in part on the first weighted score.

Figure 4:
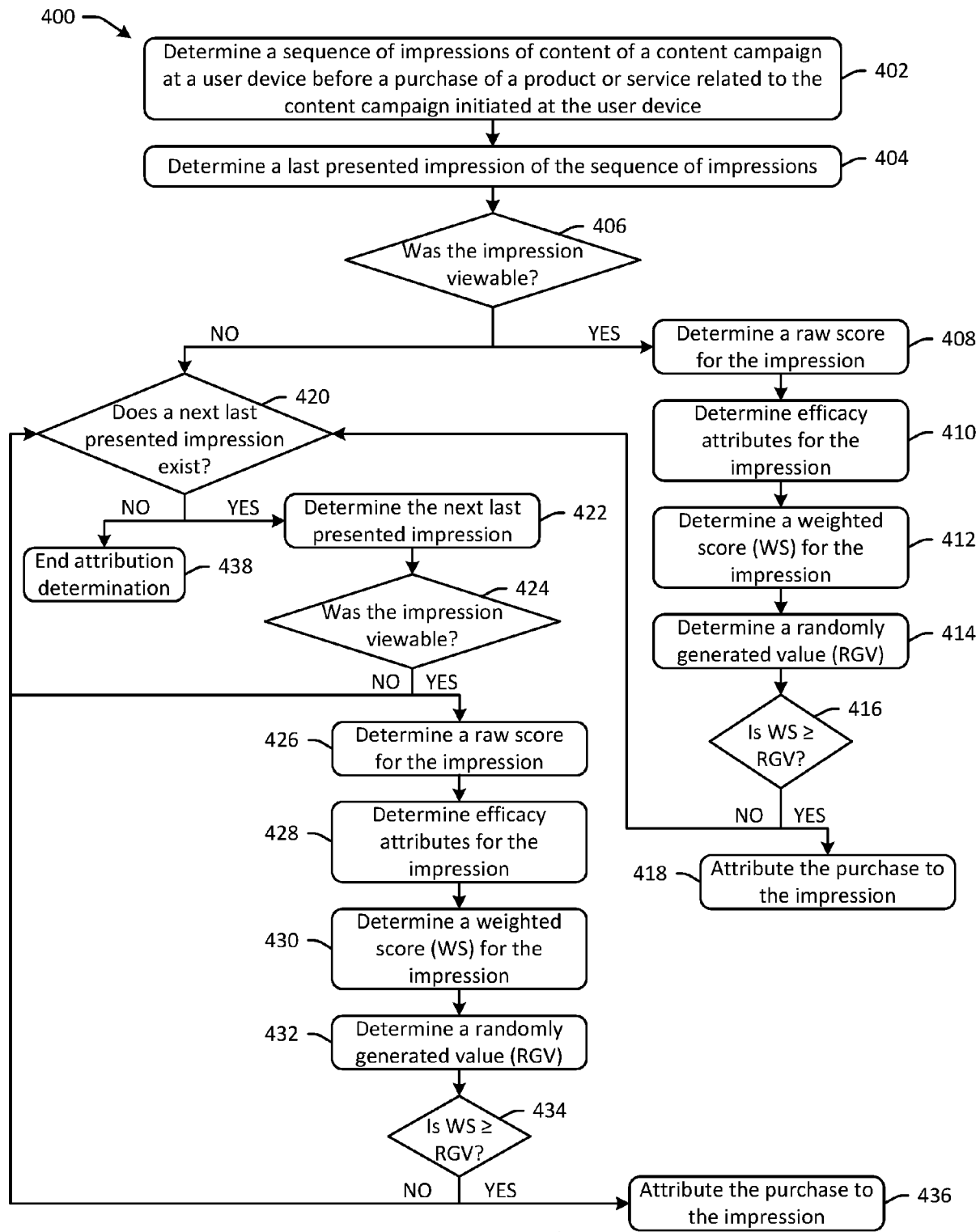
FIG. 4 is an example process flow diagram for attributing a conversion event to a viewable impression of a sequence of impressions of content of a content campaign presented at a user device in accordance with one or more embodiments of the disclosure.

FIG. 4 depicts an example process flow 400 for attributing a conversion event to a viewable impression of a sequence of impressions of content of a content campaign presented at a user device. Although certain operations are illustrated as occurring separately in FIG. 4, some or all of the operations may occur concurrently or partially concurrently across one or more computer systems. In some embodiments, the operations of the process flow 400 may be executed by a remote server, such as an attribution determination server.

At block 402 of the process flow 400, a sequence of impressions of content of a content campaign at a user device before a purchase of a product or service related to the content campaign initiated at the user device may be determined. For example, computer-executable instructions of one or more attribution determination module(s) stored at a server may be executed to determine a sequence of impressions of content of a content campaign at a user device before a purchase of a product or service related to the content campaign initiated at the user device. The sequence of impressions may include any number of impressions of any number of pieces of content of the content campaign presented at the user device before the purchase.

At block 404 of the process flow 400, a last presented impression of the sequence of impressions may be determined. For example, computer-executable instructions of one or more attribution determination module(s) stored at a server may be executed to determine a last presented impression of the sequence of impressions.

At determination block 406 of the process flow 400, a determination is made as to whether the last presented impression was viewable at the user device. For example, computer-executable instructions of one or more attribution determination module(s) stored at a server may be executed to determine whether the last presented impression was viewable at the user device. If it is determined that the last presented impression was viewable at the user device, the process flow 400 may proceed to block 408. If it is determined that the last presented impression was not viewable at the user device, the process flow 400 may proceed to block 420.

At block 408 of the process flow 400, a raw score for the last presented impression may be determined based at least in part on viewability of the impression at the user device. For example, computer-executable instructions of one or more attribution determination module(s) stored at a server may be executed to determine a raw score for the last presented impression based at least in part on viewability of the impression at the user device.

At block 410 of the process flow 400, a set of efficacy attributes for the last presented impression may be determined. For example, computer-executable instructions of one or more attribution determination module(s) stored at a server may be executed to determine a set of efficacy attributes for the last presented impression. In some instances, the set of efficacy attributes may include a content size attribute, a content density attribute, and a contextual load attribute for the impression.

At block 412 of the process flow 400, a weighted score for the last presented impression may be determined based at least in part on the raw score and the set of efficacy attributes. For example, computer-executable instructions of one or more attribution determination module(s) stored at a server may be executed to determine a weighted score for the impression based at least in part on the raw score and the set of efficacy attributes.

At block 414 of the process flow 400, a randomly generated value may be determined. For example, computer-executable instructions of one or more attribution determination module(s) stored at a server may be executed to determine a randomly generated value.

At determination block 416 of the process flow 400, a determination is made as to whether the weighted score for the last presented impression is greater than or equal to the randomly generated value. For example, computer-executable instructions of one or more attribution determination module(s) stored at a server may be executed to determine whether the weighted score for the last presented impression is greater than or equal to the randomly generated value. If it is determined that the weighted score for the last presented impression is greater than or equal to the randomly generated value, the process flow 400 may proceed to block 418. If it is determined that the weighted score for the last presented impression is not greater than or equal to the randomly generated value, the process flow 400 may proceed to block 420.

At block 418 of the process flow 400, the purchase may be attributed to the last presented impression based at least in part on the weighted score for the last presented impression. For example, computer-executable instructions of one or more attribution determination module(s) stored at a server may be executed to attribute the purchase to the last presented impression based at least in part on the determination that the weighted score for the last presented impression is greater than or equal to the randomly generated value.

At determination block 420 of the process flow 400, a determination is made as to whether a next last presented impression exists in the sequence of impressions. For example, computer-executable instructions of one or more attribution determination module(s) stored at a server may be executed to determine whether a next last presented impression exists in the sequence of impressions. If it is determined that a next last presented impression exists in the sequence of impressions, the process flow 400 may proceed to block 422. If it is determined that a next last presented impression does not exist in the sequence of impressions, the process flow 400 may proceed to block 438.

At block 422 of the process flow 400, the next last presented impression of the sequence of impressions may be determined. For example, computer-executable instructions of one or more attribution determination module(s) stored at a server may be executed to determine the next last presented impression of the sequence of impressions.

At determination block 424 of the process flow 400, a determination is made as to whether the next last presented impression was viewable at the user device. For example, computer-executable instructions of one or more attribution determination module(s) stored at a server may be executed to determine whether the next last presented impression was viewable at the user device. If it is determined that the next last presented impression was viewable at the user device, the process flow 400 may proceed to block 426. If it is determined that the next last presented impression was not viewable at the user device, the process flow 400 may return to block 420.

At block 426 of the process flow 400, a raw score for the next last presented impression may be determined based at least in part on viewability of the impression at the user device. For example, computer-executable instructions of one or more attribution determination module(s) stored at a server may be executed to determine a raw score for the next last presented impression based at least in part on viewability of the impression at the user device.

At block 428 of the process flow 400, a set of efficacy attributes for the next last presented impression may be determined. For example, computer-executable instructions of one or more attribution determination module(s) stored at a server may be executed to determine a set of efficacy attributes for the next last presented impression. In some instances, the set of efficacy attributes may include a content size attribute, a content density attribute, and a contextual load attribute for the impression.

At block 430 of the process flow 400, a weighted score for the next last presented impression may be determined based at least in part on the raw score and the set of efficacy attributes. For example, computer-executable instructions of one or more attribution determination module(s) stored at a server may be executed to determine a weighted score for the impression based at least in part on the raw score and the set of efficacy attributes.

At block 432 of the process flow 400, a randomly generated value may be determined. For example, computer-executable instructions of one or more attribution determination module(s) stored at a server may be executed to determine a randomly generated value.

At determination block 434 of the process flow 400, a determination is made as to whether the weighted score for the next last presented impression is greater than or equal to the randomly generated value. For example, computer-executable instructions of one or more attribution determination module(s) stored at a server may be executed to determine whether the weighted score for the next last presented impression is greater than or equal to the randomly generated value. If it is determined that the weighted score for the next last presented impression is greater than or equal to the randomly generated value, the process flow 400 may proceed to block 436. If it is determined that the weighted score for the next last presented impression is not greater than or equal to the randomly generated value, the process flow 400 may proceed to block 420.

At block 436 of the process flow 400, the purchase may be attributed to the next last presented impression based at least in part on the weighted score for the last presented impression. For example, computer-executable instructions of one or more attribution determination module(s) stored at a server may be executed to attribute the purchase to the next last presented impression based at least in part on the determination that the weighted score for the next last presented impression is greater than or equal to the randomly generated value.

At block 438 of the process flow 400, the attribution determination may end without attributing the purchase to any of the impressions of the sequence of impressions. For example, computer-executable instructions of one or more attribution determination module(s) stored at a server may be executed to cause the attribution determination to end without attributing the purchase to any of the impressions of the sequence of impressions.

One or more operations of the method, process flows, or use cases of FIGS. 1-4 may have been described above as being performed by a user device, or more specifically, by one or more program module(s), applications, or the like executing on a device. It should be appreciated, however, that any of the operations of methods, process flows, or use cases of FIGS. 1-4 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 5:
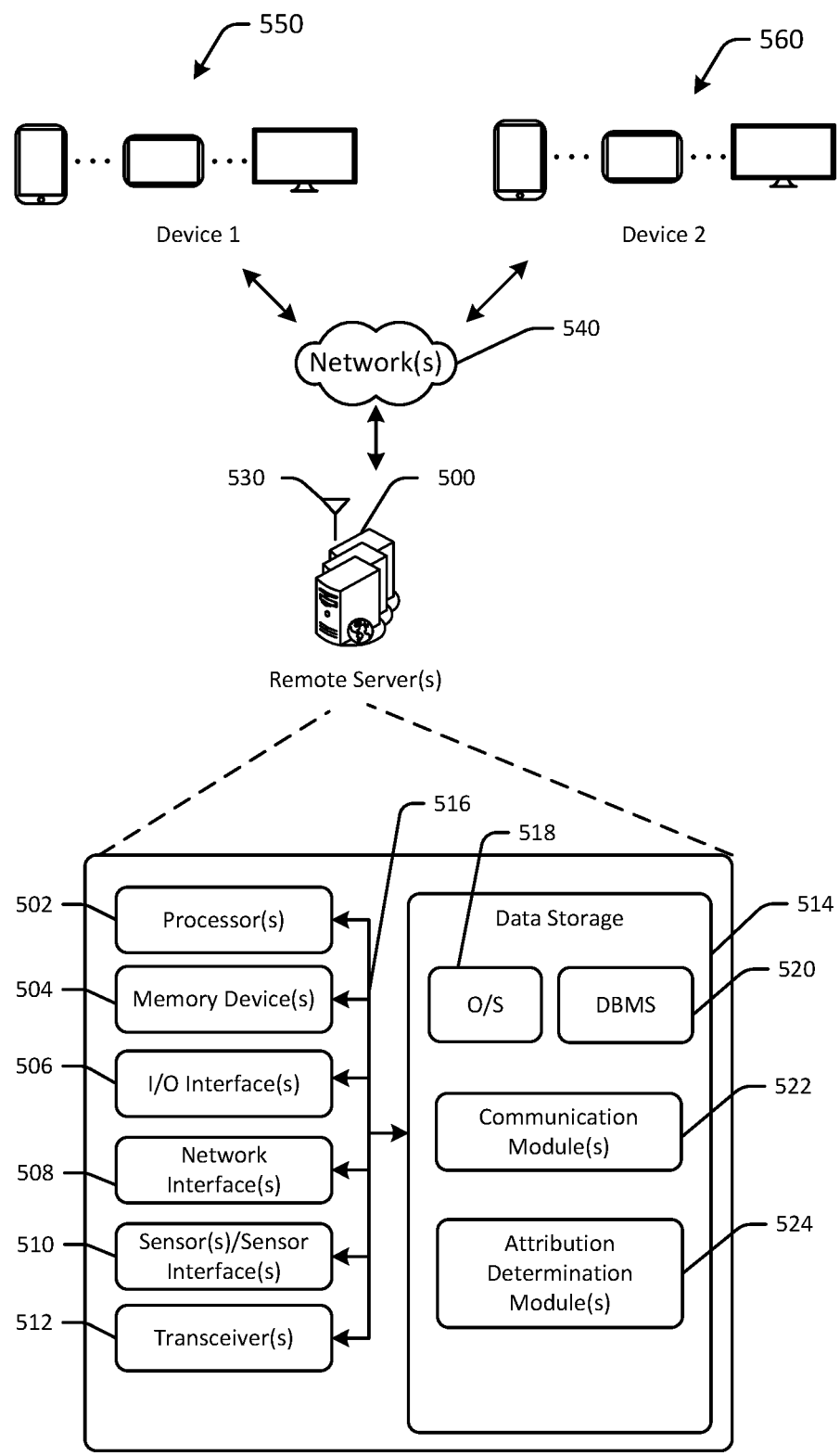
FIG. 5 schematically illustrates an example architecture of a system in accordance with one or more embodiments of the disclosure.

FIG. 5 is a schematic block diagram of one or more illustrative remote server(s) 500 in accordance with one or more example embodiments of the disclosure. The remote server(s) 500 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 500 may correspond to an illustrative device configuration for the attribution determination server(s) of FIGS. 1-4.

The remote server(s) 500 may be configured to communicate via one or more networks with one or more servers, user devices, or the like. The remote server(s) 500 may be configured to manage one or more aspects of a number of content campaigns, such as content delivery parameters, distribution of content for presentation at respective delivery slots at a webpage or in an application, and other operations. The remote server(s) 500 may be configured to deliver or cause delivery of instructions and/or one or more pieces of content and may further be configured to determine a raw score for a particular content impression based at least in part on viewability of the impression at the user device, determine efficacy attributes of the content impression, determine a weighted score for the content impression using the raw score and the efficacy attributes, and determine whether to attribute a conversion event to the content impression based at least in part on the weighted score. In some embodiments, a single remote server or single group of remote servers may be configured to perform more than one type of content delivery functionality.

The remote server(s) 500 may be configured to communicate via one or more networks 540. Such network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 540 may have any suitable communication range associated therewith and may include, for example, global networks (e.g., the Internet), metropolitan area networks (MANs), wide area networks (WANs), local area networks (LANs), or personal area networks (PANs). In addition, such network(s) 540 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In FIG. 5, the remote server(s) 500 may communicate with one or more user devices via the network(s) 540. For example, the remote server(s) 500 may communicate with a first user device 550 via the network(s) 540 when the first user device 550 is connected to the network(s) 540. Likewise, the remote server(s) 500 may communicate with a second user device 560 via the network(s) 540 when the second user device 560 is connected to the network(s) 540. The remote server(s) 500 may communicate with any number of semi-connected devices.

In an illustrative configuration, the remote server(s) 500 may include one or more processors (processor(s)) 502, one or more memory devices 504 (also referred to herein as memory 504), one or more input/output ("I/O") interface(s) 506, one or more network interface(s) 508, one or more sensors or sensor interface(s) 510, one or more transceivers 512, and data storage 514. The remote server(s) 500 may further include one or more buses 516 that functionally couple various components of the remote server(s) 500. The remote server(s) 500 may further include one or more antenna(e) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 516 may include at least one of a system bus, a memory bus, an address bus, or a message bus, and may permit the exchange of information (e.g., data (including computer-executable code), signaling, etc.) between various components of the remote server(s) 500. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 504 and the data storage 514, removable and/or non-removable, are examples of computer-readable storage media (CRSM) as that term is used herein.

The data storage 514 may store computer-executable code, instructions, or the like that may be loadable into the memory 504 and executable by the processor(s) 502 to cause the processor(s) 502 to perform or initiate various operations. The data storage 514 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to data storage 514 for non-volatile storage.

More specifically, the data storage 514 may store one or more operating systems (O/S) 518; one or more database management systems (DBMS) 520; and one or more program module(s), applications, engines, computer-executable code, scripts, or the like such as, for example, one or more communication module(s) 522 and/or one or more attribution determination module(s) 524. Some or all of these module(s) may be or include sub-module(s). Any of the components depicted as being stored in data storage 514 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 514 may support the functionality described in reference to the corresponding components named earlier in this disclosure.

The data storage 514 may further store various types of data utilized by the components of the remote server(s) 500. Any data stored in the data storage 514 may be loaded into the memory 504 for use by the processor(s) 502 in executing computer-executable code. In addition, any data depicted as being stored in the data storage 514 may potentially be stored in one or more datastore(s) and may be accessed via the DBMS 520 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, an example datastore(s) may include, for example, content campaign information, transaction history information, one or more attribution models, attribution history information, content performance data, and/or other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the communication module(s) 522 may include computer-executable instructions, code, or the like that responsive to execution by one or more of the processor(s) 502 may perform functions including, but not limited to, communicating with remote servers, communicating with remote datastores, communicating with user devices, sending or receiving information and instructions, and the like.

The attribution determination module(s) 524 may include computer-executable instructions, code, or the like that responsive to execution by one or more of the processor(s) 502 may perform functions including, but not limited to, determining first content and second content of a content campaign for presentation at a user device of a user, the content campaign related to a product or service, sending the first content and the second content to the user device for viewing by the user, receiving an indication of a conversion event related to the product or service by the user, determining a sequence of impressions of content of the content campaign presented at the user device before the conversion event, the sequence of impressions including a first impression of the first content and a second impression of the second content, determining a first raw score for the first impression based at least in part on viewability of the first impression at the user device, determining a first set of efficacy attributes for the first impression, the first set of efficacy attributes including a first content size attribute, a first content density attribute, and a first contextual load attribute, determining a first weighted score for the first impression based at least in part on the first raw score and the first set of efficacy attributes, and attributing the conversion event to the first impression based at least in part on the first weighted score, and the like.

Referring now to other illustrative components depicted as being stored in the data storage 514, the O/S 518 may be loaded from the data storage 514 into the memory 504 and may provide an interface between other application software executing on the remote server(s) 500 and the hardware resources of the remote server(s) 500. More specifically, the O/S 518 may include a set of computer-executable instructions for managing the hardware resources of the remote server(s) 500 and for providing common services to other application programs (e.g., managing memory allocation among various application programs). In certain example embodiments, the O/S 518 may control execution of the other program module(s) to dynamically enhance characters for content rendering. The O/S 518 may include any operating system now known or which may be developed in the future including, but not limited to, any server operating system, any mainframe operating system, or any other proprietary or non-proprietary operating system.

The DBMS 520 may be loaded into the memory 504 and may support functionality for accessing, retrieving, storing, and/or manipulating data stored in the memory 504 and/or data stored in the data storage 514. The DBMS 520 may use any of a variety of database models (e.g., relational model, object model, etc.) and may support any of a variety of query languages. The DBMS 520 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 500 is a mobile device, the DBMS 520 may be any suitable light-weight DBMS optimized for performance on a mobile device.

Referring now to other illustrative components of the remote server(s) 500, the input/output (I/O) interface(s) 506 may facilitate the receipt of input information by the remote server(s) 500 from one or more I/O devices as well as the output of information from the remote server(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 530 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 500 may further include one or more network interface(s) 508 via which the remote server(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(e) 530 may include any suitable type of antenna depending, for example, on the communications protocols used to transmit or receive signals via the antenna(e) 530. Nonlimiting examples of suitable antennae may include directional antennae, non-directional antennae, dipole antennae, folded dipole antennae, patch antennae, multiple-input multiple-output (MIMO) antennae, or the like. The antenna(e) 530 may be communicatively coupled to one or more transceivers 512 or radio components to which or from which signals may be transmitted or received.

As previously described, the antenna(e) 530 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 530 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHz channels (e.g., 802.11n, 802.11ac), or 60 GHz channels (e.g., 802.11ad). In alternative example embodiments, the antenna(e) 530 may be configured to transmit or receive radio frequency signals within any suitable frequency range forming part of the unlicensed portion of the radio spectrum.

The antenna(e) 530 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for - in cooperation with the antenna(e) 530 - transmitting or receiving radio frequency (RF) signals in the bandwidth and/or channels corresponding to the communications protocols utilized by the remote server(s) 500 to communicate with other devices. The transceiver(s) 512 may include hardware, software, and/or firmware for modulating, transmitting, or receiving - potentially in cooperation with any of antenna(e) 530 - communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 5 as being stored in the data storage 514 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 500, and/or hosted on other computing device(s) accessible via one or more networks, may be provided to support the functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the remote server(s) 500 may include alternate and/or additional hardware, software, or firmware components beyond those described or depicted without departing from the scope of the disclosure. More particularly, it should be appreciated that software, firmware, or hardware components depicted as forming part of the remote server(s) 500 are merely illustrative and that some components may not be present or additional components may be provided in various embodiments. While various illustrative program module(s) have been depicted and described as software module(s) stored in the data storage 514, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

That which is claimed is:

1. A method comprising:
   determining, by one or more computer processors coupled to at least one memory, first content and second content of a content campaign for presentation at a user device, the content campaign related to a product;
   sending the first content and the second content to the user device;
   receiving a first indication of a first impression of the first content at the user device;
   receiving a second indication of a second impression of the second content at the user device;
   receiving a third indication of a purchase of the product initiated at the user device;
   determining a sequence of impressions of content of the content campaign at the user device before the purchase, the sequence of impressions comprising the first impression and the second impression;
   determining a first raw score for the first impression based at least in part on a first viewability of the first impression at the user device, wherein the first viewability is based at least in part on a first amount of the first impression presented at the user device;
   determining a first set of efficacy attributes for the first impression, the first set of efficacy attributes comprising a first content size attribute, a first content density attribute, and a first contextual load attribute;
   determining a first weighted score for the first impression based at least in part on the first raw score and the first set of efficacy attributes, wherein the first weighted score is between a first value and a second value;
   determining, based at least in part on having received the first indication of the first impression of the first content at the user device, a first randomly generated value, wherein the first randomly generated value is between the first value and the second value;
   determining that the first weighted score is greater than the first randomly generated value;
   attributing the purchase to the first impression based at least in part on the determination that the first weighted score is greater than the first randomly generated value;
   determining click-through data for the first content over a time period;
   updating one or more attribution models comprising the first weighted score based on the click-through data; and
   determining that the purchase is to be attributed to the second impression based at least in part on the click-through data.

2. The method of claim 1, wherein determining the first weighted score for the first impression based at least in part on the first raw score and the first set of efficacy attributes comprises:
   determining a first weight value for the first content size attribute;
   determining a second weight value for the first content density attribute;
   determining a third weight value for the first contextual load attribute; and
   multiplying the first raw score by the first weight value, the second weight value, and the third weight value to produce the first weighted score.

3. The method of claim 2, further comprising:
   determining a fourth weight value for the first content size attribute based at least in part on the click-through data;
   determining a fifth weight value for the first content density attribute based at least in part on the click-through data; and determining a sixth weight value for the first contextual load attribute based at least in part on the click-through data.

4. The method of claim 1, further comprising:
determining that the second impression was presented at the user device after the first impression;
determining a second raw score for the second impression based at least in part on a second viewability of the second impression at the user device, wherein the second viewability is based at least in part on a second amount of the second impression presented at the user device;
determining a second set of efficacy attributes for the second impression, the second set of efficacy attributes comprising a second content size attribute, a second content density attribute, and a second contextual load attribute;
determining a second weighted score for the second impression based at least in part on the second raw score and the second set of efficacy attributes;
determining a second randomly generated value;
determining that the second weighted score is less than the first randomly generated value.

5. A method comprising:
determining, by one or more computer processors coupled to at least one memory, first content and second content of a content campaign for presentation at a first user device, the content campaign related to a product or service;
receiving a first indication of a first conversion event related to the product or service at the first user device;
determining that a first impression of the first content and a second impression of second content of the content campaign were presented at the first user device before the first conversion event;
determining a first raw score for the first impression based at least in part on a first viewability of the first impression at the first user device, wherein the first viewability is based at least in part on a first amount of the first impression presented at the first user device;
determining a first set of efficacy attributes for the first impression;
determining a first weighted score for the first impression based at least in part on the first raw score and the first set of efficacy attributes, wherein the first weighted score is between a first value and a second value;
determining, based at least in part on having received the first indication of the first conversion event related to the product or service at the first user device, a first randomly generated value, wherein the first randomly generated value is between the first value and the second value;
determining that the first weighted score is greater than the first randomly generated value;
attributing the first conversion event to the first impression based at least in part on the determination that the first weighted score is greater than the first randomly generated value;
determining click-through data for the first content over a time period;
updating one or more attribution models comprising the first weighted score based on the click-through data; and
determining that the first conversion event is to be attributed to the second impression based at least in part on the click-through data.

6. The method of claim 5, wherein determining the first raw score for the first impression based at least in part on the first viewability of the first impression at the first user device comprises determining that 100 percent of the first content was presented at the first user device.

7. The method of claim 5, wherein determining the first raw score for the first impression based at least in part on the first viewability of the first impression at the first user device comprises determining that at least 50 percent of the first content was presented at the first user device for at least one second.

8. The method of claim 5, wherein the first set of efficacy attributes comprises a first content size attribute for the first impression, a first content density attribute for the first impression, and a first contextual load attribute for the first impression.

9. The method of claim 5, wherein the first set of efficacy attributes comprises a first content dimension attribute for the first impression, a first dwell time attribute for the first impression, or a first elapsed time attribute for the first impression.

10. The method of claim 5, further comprising:
determining that the second impression of the second content of the content campaign was presented at the first user device after the first impression and before the first conversion event;
determining a second set of efficacy attributes for the second impression;
determining a second weighted score for the second impression based at least in part on the second raw score and the second set of efficacy attributes;
determining a second randomly generated value; and
determining that the second weighted score is less than the second randomly generated value.

11. The method of claim 10, further comprising:
receiving a second indication of a second conversion event related to the product or service at a second user device;
determining that a third impression of the first content was presented at the second user device before the second conversion event;
determining that a fourth impression of the second content was presented at the second user device after the third impression and before the second conversion event;
determining a third raw score for the fourth impression based at least in part on a third viewability of the fourth impression at the second user device;
determining a third set of efficacy attributes for the fourth impression;
determining a third weighted score for the fourth impression based at least in part on the third raw score and the third set of efficacy attributes; and
attributing the second conversion event to the fourth impression based at least in part on the third weighted score.

12. The method of claim 5, wherein determining the first weighted score for the first impression based at least in part on the first raw score and the first set of efficacy attributes comprises:
determining a first weight value for a first efficacy attribute of the first set of efficacy attributes;
determining a second weight value for a second efficacy attribute of the first set of efficacy attributes; and determining the first weighted score based at least in part on the first weight value and the second weight value.

13. The method of claim 12, further comprising:
determining a third weight value for the first efficacy attribute based at least in part on the click-through data; and
determining a fourth weight value for the second efficacy attribute based at least in part on the click-through data.

14. The method of claim 13, further comprising:
receiving a second indication of a second conversion event related to the product or service at a second user device;
determining that a second impression of the first content was presented at the second user device before the second conversion event;

determining a second raw score for the second impression based at least in part on a second viewability of the second impression at the second user device; and determining a second weighted score for the second impression based at least in part on the second raw score, the third weight value, and the fourth weight value.

15. The method of claim 5, further comprising generating a performance report for the first content over a time period, the performance report comprising a performance metric based at least in part on a number of conversion events attributed to impressions of the first content over the time period.

16. A device comprising:
at least one memory that stores computer-executable instructions; and
at least one processor configured to access the at least one memory and execute the computer-executable instructions to:
determine first content and second content of a content campaign for presentation at a first user device, the content campaign related to a product or service;
receive a first indication of a first conversion event related to the product or service at the first user device;
determine that a first impression of the first content and a second impression of a second content of the content campaign, the first impression and the second impression were presented at the first user device before the first conversion event;
determine a first raw score for the first impression based at least in part on a first viewability of the first impression at the first user device, wherein the first viewability is based at least in part on a first amount of the first impression presented at the first user device;
determine a first set of efficacy attributes for the first impression;
determine a first weighted score for the first impression based at least in part on the first raw score and the first set of efficacy attributes, wherein the first weighted score is between a first value and a second value;
determine, based at least in part on having received the first indication of the first conversion event related to the product or service at the first user device, a first randomly generated value, wherein the first randomly generated value is between the first value and the second value;
determine that the first weighted score is greater than the first randomly generated value;
attribute the first conversion event to the first impression in response to the first weighted score being greater than the first randomly generated value;
determine click-through data for the first content over a time period;
update one or more attribution models comprising the first weighted score based on the click-through data; and
attribute the first conversion event to the second impression based at least in part on the click-through data.

17. The device of claim 16, wherein the at least one processor is further configured to access the at least one memory and execute the computer-executable instructions to:
determine that the second impression of the second content of the content campaign was presented at the first user device after the first impression and before the first conversion event;
determine a second set of efficacy attributes for the second impression;
determine a second weighted score for the second impression based at least in part on the second raw score and the second set of efficacy attributes;
determine a second randomly generated value; and
determine that the second weighted score is less than the second randomly generated value.

18. The device of claim 16, wherein the at least one processor is further configured to access the at least one memory and execute the computer-executable instructions to:
determine a first weight value for a first efficacy attribute of the first set of efficacy attributes;
determine a second weight value for a second efficacy attribute of the first set of efficacy attributes; and
determine the first weighted score based at least in part on the first weight value and the second weight value.

19. The device of claim 18, wherein the at least one processor is further configured to access the at least one memory and execute the computer-executable instructions to:
determine a third weight value for the first efficacy attribute based at least in part on the click-through data; and
determine a fourth weight value for the second efficacy attribute based at least in part on the click-through data.

* * * * *